US008194988B2

(12) United States Patent
Gou et al.

(10) Patent No.: US 8,194,988 B2
(45) Date of Patent: Jun. 5, 2012

(54) METHODS FOR CALCULATING VIDEO INVERSE TRANSFORM

(75) Inventors: Dayin Gou, San Jose, CA (US); Shuguang Gong, Beijing (CN)

(73) Assignee: Augusta Technology, Inc., Santa Clara, CA (US)

( * ) Notice: Subject to any disclaimer, the term of this patent is extended or adjusted under 35 U.S.C. 154(b) by 958 days.

(21) Appl. No.: 12/195,243

(22) Filed: Aug. 20, 2008

(65) Prior Publication Data
US 2009/0052791 A1 Feb. 26, 2009

Related U.S. Application Data

(60) Provisional application No. 60/956,915, filed on Aug. 20, 2007.

(51) Int. Cl.
*G06K 9/36* (2006.01)

(52) U.S. Cl. ........ 382/232; 382/248; 382/250; 382/251; 375/240.12

(58) Field of Classification Search .................. 382/232, 382/248, 250, 251, 305; 348/395, 403; 375/240.12; 358/426.01, 426.16

See application file for complete search history.

(56) References Cited

U.S. PATENT DOCUMENTS

| 5,881,301 | A | * | 3/1999 | Robbins ........................... 712/1 |
| 6,067,320 | A | * | 5/2000 | Takahashi et al. ........ 375/240.12 |
| 6,434,196 | B1 | * | 8/2002 | Sethuraman et al. ..... 375/240.12 |
| 7,627,038 | B2 | * | 12/2009 | Moni et al. ............... 375/240.21 |

* cited by examiner

*Primary Examiner* — Ali Bayat
(74) *Attorney, Agent, or Firm* — Venture Pacific Law, PC

(57) ABSTRACT

Inverse transforms used in video and image compression/decompression, such as DCT/IDCT used in MPEG-2 and MPEG-4, or the integer transforms used in H.264, are usually calculated with fast algorithms, which only take advantage of the symmetry existing in the transform matrix but ignores the peculiarities in the input data. While these kind of fast algorithms can apply to both forward and inverse transforms, they tend to be inefficient in calculating inverse transforms. In inverse transforms, most of the coefficients become zero after quantization, this invention takes advantage of this fact to further simplify the general fast algorithm and speed up the calculation.

18 Claims, 7 Drawing Sheets

$$ei0 = di0 + di2, \text{ with } i = 0..3$$
$$ei1 = di0 - di2, \text{ with } i = 0..3$$
$$ei2 = (di1 >> 1) - di3, \text{ with } i = 0..3$$
$$ei3 = di1 + (di3 >> 1), \text{ with } i = 0..3$$

$$fi0 = ei0 + ei3, \text{ with } i = 0..3$$
$$fi1 = ei1 + ei2, \text{ with } i = 0..3$$
$$fi2 = ei1 - ei2, \text{ with } i = 0..3$$
$$fi3 = ei0 - ei3, \text{ with } i = 0..3$$

$$g0j = f0j + f2j, \text{ with } j = 0..3$$
$$g1j = f0j - f2j, \text{ with } j = 0..3$$
$$g2j = (f1j >> 1) - f3j, \text{ with } j = 0..3$$
$$g3j = f1j + (f3j >> 1), \text{ with } j = 0..3$$

$$h0j = g0j + g3j, \text{ with } j = 0..3$$
$$h1j = g1j + g2j, \text{ with } j = 0..3$$
$$h2j = g1j - g2j, \text{ with } j = 0..3$$
$$h3j = g0j - g3j, \text{ with } j = 0..3$$

$$rij = (hij + 2^5) >> 6, \text{ with } i, j = 0..3$$

$ei0 = di0 + di2$, with $i = 0..3$
$ei1 = di0 - di2$, with $i = 0..3$
$ei2 = (di1 >> 1) - di3$, with $i = 0..3$
$ei3 = di1 + (di3 >> 1)$, with $i = 0..3$ $fi0 = ei0 + ei3$, with $i = 0..3$
$fi1 = ei1 + ei2$, with $i = 0..3$
$fi2 = ei1 - ei2$, with $i = 0..3$
$fi3 = ei0 - ei3$, with $i = 0..3$ $g0j = f0j + f2j$, with $j = 0..3$
$g1j = f0j - f2j$, with $j = 0..3$
$g2j = (f1j >> 1) - f3j$, with $j = 0..3$
$g3j = f1j + (f3j >> 1)$, with $j = 0..3$ $h0j = g0j + g3j$, with $j = 0..3$
$h1j = g1j + g2j$, with $j = 0..3$
$h2j = g1j - g2j$, with $j = 0..3$
$h3j = g0j - g3j$, with $j = 0..3$ $rij = (hij + 2^5) >> 6$, with $i, j = 0..3$

FIG. 1

```
// ------------stage 0-------------
m0 = 32 + x0 ;      // 0
m1 = x1 >> 1 ;      // 1
m2 = x8 - x2 ;      // 2
m3 = x2 + x8 ;      // 3
m4 = x3 >> 1 ;      // 4
m5 = x6 - x4 ;      // 5
m6 = x4 + x6 ;      // 6
m7 = x5 >> 1 ;      // 7
m8 = x7 >> 1 ;      // 8
m9 = x9 >> 1 ;      // 9
m10 = x11 >> 1 ;    // 10
m11 = x14 - x12 ;   // 11
m12 = x12 + x14 ;   // 12
m13 = x13 >> 1 ;    // 13
m14 = x15 >> 1 ;    // 14

// ------------stage 1-------------
m15 = x1 + m4 ;     // 15
m16 = m1 - x3 ;     // 16
m17 = x5 + m8 ;     // 17
m18 = m7 - x7 ;     // 18
m19 = x9 + m10 ;    // 19
m20 = m0 - x10 ;    // 20
m21 = x10 + m0 ;    // 21
m22 = m9 - x11 ;    // 22
m23 = x13 + m14 ;   // 23
m24 = m13 - x15 ;   // 24
```

FIG. 2A

```
// ------------stage 2-------------
m25 = m20 - m2 ;    // 25
m26 = m2 + m20 ;    // 26
m27 = m21 - m3 ;    // 27
m28 = m3 + m21 ;    // 28
m29 = m18 - m5 ;    // 29
m30 = m5 + m18 ;    // 30
m31 = m17 - m6 ;    // 31
m32 = m6 + m17 ;    // 32
m33 = m24 - m11 ;   // 33
m34 = m11 + m24 ;   // 34
m35 = m12 - m23 ;   // 35
m36 = m12 + m23 ;   // 36
m37 = m19 - m15 ;   // 37
m38 = m15 + m19 ;   // 38
m39 = m22 - m16 ;   // 39
m40 = m16 + m22 ;   // 40

// ------------stage 3-------------
m41 = m25 - m37 ;   // 41
m42 = m37 + m25 ;   // 42
m43 = m26 - m40 ;   // 43
m44 = m40 + m26 ;   // 44
m45 = m27 - m39 ;   // 45
m46 = m39 + m27 ;   // 46
m47 = m28 - m38 ;   // 47
m48 = m38 + m28 ;   // 48
m49 = m29 >> 1 ;    // 49
```

// ------------stage 4-------------
m57 = m53 + m29 ;  // 57
m58 = m31 - m55 ;  // 58
m59 = m56 + m32 ;  // 59
m60 = m33 - m49 ;  // 60
m61 = m36 - m52 ;  // 61
m62 = m50 >> 1 ;  // 62
m63 = m51 >> 1 ;  // 63
m64 = m54 >> 1 ;  // 64

// ------------stage 5-------------
m65 = m30 - m64 ;  // 65
m66 = m62 + m34 ;  // 66
m67 = m63 - m35 ;  // 67
m68 = m41 - m61 ;  // 68
m69 = m41 + m61 ;  // 69
m70 = m44 - m57 ;  // 70
m71 = m44 + m57 ;  // 71
m72 = m45 - m60 ;  // 72
m73 = m45 + m60 ;  // 73
m74 = m47 - m58 ;  // 74
m75 = m47 + m58 ;  // 75
```

// ------------stage 6-------------
m78 = m42 - m67 ;  // 78
m79 = m42 + m67 ;  // 79
m80 = m43 - m65 ;  // 80
m81 = m43 + m65 ;  // 81
m82 = m46 - m66 ;  // 82
m83 = m46 + m66 ;  // 83
y0 = m77 >> 6 ;  // 84
y1 = m71 >> 6 ;  // 85
y3 = m74 >> 6 ;  // 86
y4 = m68 >> 6 ;  // 87
y5 = m72 >> 6 ;  // 88
y8 = m69 >> 6 ;  // 89
y9 = m73 >> 6 ;  // 90
y12 = m76 >> 6 ;  // 91
y13 = m70 >> 6 ;  // 92
y15 = m75 >> 6 ;  // 93

// ------------stage 7-------------
y2 = m80 >> 6 ;  // 94
y6 = m83 >> 6 ;  // 95
y7 = m79 >> 6 ;  // 96
y10 = m82 >> 6 ;  // 97
y11 = m78 >> 6 ;  // 98
y14 = m81 >> 6 ;  // 99
```

FIG. 2D

```
// ---------------stage 0-------------
m0 = 32 + x0 ;  // 0
m1 = x1 >> 1 ;  // 1
m2 = x3 >> 1 ;  // 2

// ---------------stage 1-------------
m3 = x1 + m2 ;  // 3
m4 = m0 - x2 ;  // 4
m5 = x2 + m0 ;  // 5
m6 = m1 - x3 ;  // 6

// ---------------stage 2-------------
m7 = m5 - m3 ;  // 7
m8 = m3 + m5 ;  // 8
m9 = m4 - m6 ;  // 9
m10 = m6 + m4 ; // 10

// ---------------stage 3-------------
y0 = m8 >> 6 ;  // 11
y1 = m10 >> 6 ; // 12
y2 = m9 >> 6 ;  // 13
y3 = m7 >> 6 ;  // 14

// ---------------stage 4-------------
y4 = y0; // 15
y8 = y0; // 16
y12 = y0; // 17
y5 = y1; // 18
y9 = y1; // 19
y13 = y1; // 20
y6 = y2; // 21
y10 = y2; // 22
y14 = y2; // 23
y7 = y3; // 24
y11 = y3; // 25
y15 = y3; // 26
```

FIG. 3

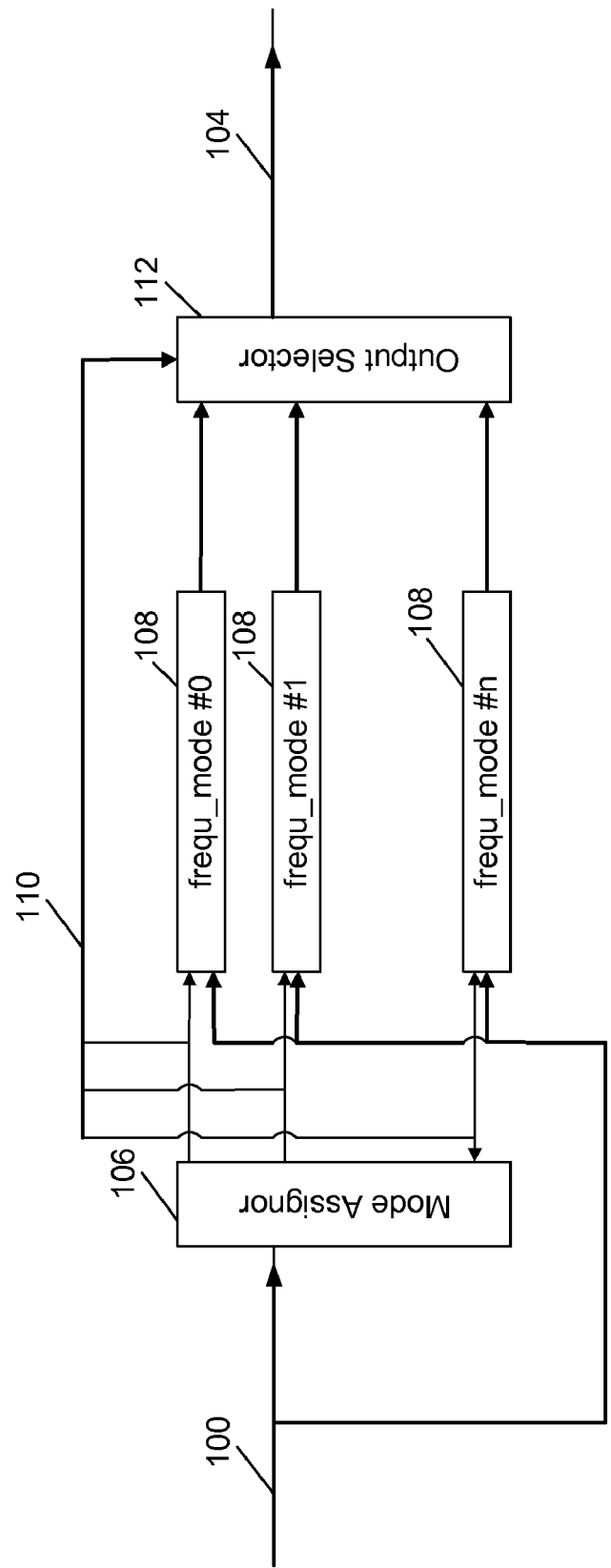
FIG. 5A (Prior Art)
FIG. 5B

METHODS FOR CALCULATING VIDEO INVERSE TRANSFORM

CROSS REFERENCE

This application claims priority from a provisional patent application entitled "Methods and Circuits for Video Inverse Transform" filed on Aug. 20, 2007 and having an Application No. 60/956,915. Said application is incorporated herein by reference.

FIELD OF INVENTION

This invention relates generally to compressed video decoding, and, in particular, to methods for reducing the amount of computations used for inverse transforms for a compressed video.

BACKGROUND

Most of the video and image compression standards in commercial use, for example, MPEG-2, MPEG-4, H.264 and JPEG, are based on block motion estimation and transformation. On the encoding side, motion estimation is made on previously encoded and reconstructed reference pictures; the residual between the pixels on the current picture and the prediction from motion estimation is transformed; the coefficients will be quantized, converted into 1-dimension through a process called zigzag; further compressed with variable length coding (VLC); and then wrapped up into bit stream based on the specific syntax of the standard.

On the decoding side, inverse transform is an essential part of the decompression procedure, which is usually very time consuming as well. Reducing the computation required to decompress video is not only one of the main interests in the academic community, but the industry has also put a lot of effort as well in order to enable commercial applications derived from these video standards.

Generally, fast algorithms are developed and used to reduce the computation required in both the forward transform and inverse transform. These fast algorithms are usually derived by taking advantage of the symmetrical properties existing in the transform matrix elements and the linearity of the transforms. It does not assume any other properties in the input data, so the fast algorithms for forward transform and inverse transform are usually very similar. Typical examples of these kind of fast algorithms include FFT (Fast Fourier Transform), various fast transforms developed in DCT (Discrete Cosine Transform), etc.

While these kind of fast algorithms save a lot of computations when compared to some brute-force methods, when applied to inverse transform, they fail to take advantage of other important properties existing in the input data (i.e. transform coefficients) which can be used to further reduce the number of computations. Among the transform coefficients taken as input data in inverse transform, many of them become zero after quantization, another essential step to achieve video/image data compression on the encoding side. For example, it is quite common in the H.264 based video stream, that 4×4 block will only have 1 or 2 non-zero coefficients, while the generic fast algorithm blindly assumes all 16 coefficients are non-zero.

The number zero possess the much desired elegance that when it is multiplied to another number the product is zero, and the sum is just the other operand when it is added to another number. If these simple properties of the number zero are ingeniously taken advantage of, computation can be further reduced. Reduction of computations will lead to other advantages, for example, handheld electronic devices derived from video decompression can run at lower frequency so as to save power.

SUMMARY OF INVENTION

Briefly, the present invention relates to methods for calculating an inverse transform of input data, wherein said input data having a plurality of coefficients, and may comprise the steps of: determining a plurality of computation modes; representing said computation modes by a plurality of representative computation modes as a function of the non-zero coefficients of the input data; selecting one of the representative computation modes as a function of the input data; and inverse transforming the input data using said selected representative computation mode.

DESCRIPTION OF THE DRAWINGS

Computations can be further reduced by using methods which take advantage of the peculiarities in the input data, specifically, the many zeros in the input data of the inverse transform in video/image decompression, which will be described in detail in this invention in conjunction with the drawings, wherein, FIG. 1 illustrates an inverse transform of the scaled transform coefficients for residual 4×4 blocks as defined in the H.264 standard.

FIGS. 2A-2D illustrate the computation mode where all the 16 scaled coefficients are non-zeros, where the original input $d_{ij}$ (i=0, . . . 3, j=0 . . . 3) in FIG. 1 are renamed to $x_k$ with k=0, . . . , 15.

FIG. 3 illustrates the computation mode where only $x_0$, $x_1$, $x_2$ and $x_3$ are non-zeros while all other coefficients are zeros.

FIG. 5A illustrates a procedure for computing the inverse transform with a single computation mode in the prior art.

FIG. 5B illustrates a procedure for computing the inverse transform with one of the frequently occurring representative computation modes.

DESCRIPTION OF THE PREFERRED EMBODIMENTS

Figure 4:
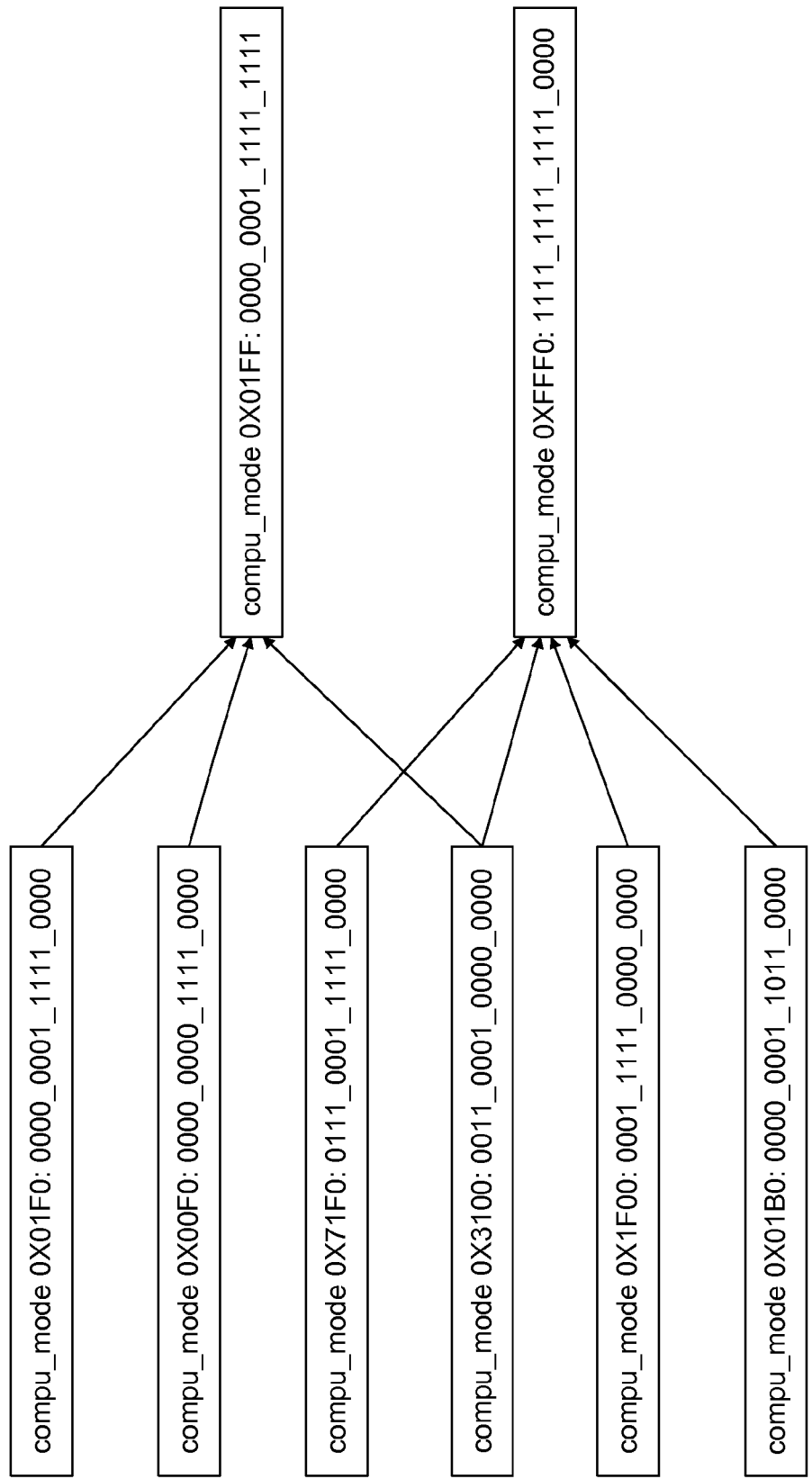
FIG. 4 illustrates certain computation modes where the modes in the left can be computed by using the modes in the right if there is an arrow from the left to the right.

In the most generic sense, the inverse transform can be abstracted as mathematical processing of a plurality of input data to generate a plurality of output data. There are no constraints regarding the input data, nor the mathematical processing. For example, the input data can have more zeros or less zeros, or no zeros at all. The mathematical processing can be linear or non-linear. Though typical examples can be taken from video/audio compression and decompression, the applicability of the invention should be understood at its broadest coverage. Without loss of generality, throughout this description we will use an example in FIG. 1, which is the inverse transformation of the scaled transform coefficients for residual 4×4 blocks as defined in H.264 standard.

Computation Mode (denoted as compu_mode for short): computation mode is a term defined in this invention to be the fast algorithm developed in considering properties of both the (inverse) transform and the input data. This contrasts to the prior art that only the properties of the transforms were investigated and effectively used when developing fast algorithms, while the peculiarities in the input data were not used at all. The properties of the (inverse) transform, for example, consist of the symmetry of constant multipliers used to manipulate the input data. The peculiarities of the input data, for example, manifest themselves as the many zeros. When considering both a specific transform and the input data, a computation mode will be only defined by the characteristics of the input data if the transform is unambiguously defined mathematically. Without loss of generality, in the description of this invention, a computation mode is associated with the number and the locations of the zeros in the input data. For each computation mode, a specific fast algorithm can be developed. In this document, a different computation mode is represented by a different sequence of atomic computations. An atomic computation is one that cannot be further decomposed into even simpler computations given the computing resources. In this description, for illustrative purposes, the atomic computations are defined to include addition, subtraction, multiplication and right shift, all in integers.

Computation Cost (denoted as compu_cost for short): The computation cost is defined as the amount of physical resources used to realize the computation. For example, the physical resource can be memory size or cycles. In this description, the number of atomic computations are used to represent the cost, since it is closely related to the number of cycles required to do the computation. In general, different computation modes should have different computation costs though some may happen to be the same.

Examples of computation modes: FIGS. 2A-2D illustrate the computation mode where none of the 16 scaled coefficients are zero; as can be seen, there are 100 computations in the sequence and so the computation cost is 100. FIG. 3 illustrates another computation mode where only the first four coefficients are non-zeros while all other coefficients are zeros. The computation cost for the computation mode illustrated by FIG. 3 is 27. As can be seen, the computation mode illustrated by FIG. 3 is much more efficient than the computation mode illustrated by FIG. 2.

Number of distinctive computation modes: Ideally, the zeros and their locations in the input data will uniquely define a computation mode that will be optimal for the particular input data. So the number of distinctive computation modes will be $2^n$ assuming that there are n coefficients in the input data. In the case of residual 4×4 blocks in H.264, since there are 16 coefficients in the input, so there will be $2^{16}=65536$ distinctive computation modes. In the case of 8×8 inverse transform in MPEG-2, the number will be even more mind-boggling reaching $2^{64}$. To simplify the description, when the number of coefficients in the input is n, the computation mode is denoted with an n-bit integer number, where the n-th bit location is associated with the n-th coefficient in the input data. For example, compu_mode(254), or compu_mode (0x00fe) in hexadecimal format, will be optimal for input data where the 1 to 7-th coefficients are non-zeros while all the other coefficients are all zeros.

Relationship between computation modes and input data: To incorporate all the distinctive computation modes in an implementation and dispatch a set of input data to its optimal computation mode will not be practical in reality due to the large number of distinctive computation modes. In fact, even if it is possible to do so, it is not economical in terms of implementation cost, since some of the computation modes will be rarely used. Fortunately, a computation mode as defined above has the nice property that one computation mode can be employed to calculate more than one set of input data, and on the other hand, a set of input data can be calculated by more than one computation mode. Using the H.264 residual 4×4 block example, an input set with only the 0-th coefficient is non-zero can be calculate by compu_mode (0x0001), compu_mode(0x0003), and compu_mode (0x000f), etc. By the same token, comp_mode(0xffff) can be used to calculate all input sets. In general, whether a computation mode x can be computed by another computation mode y or not can be determined by checking all the corresponding bits of x and y. Denoting the i-th bit of x and y to be $x_i$ and $y_i$ and the result of the check at the i-th bit to be $z_i$, then $z_i=(\sim x_i + y_i)$, where $\sim x_i$ means the logical negation of $x_i$. Mode x can be computed by mode y if at every bit location $z_i$ is true.

Some examples to show whether one computation mode can be computed by another mode or not: In FIG. 4, there are some computations on the left and some others on the right. The computations on the left can be computed by the computation mode on the right if there is an arrow going from the left to the right. To clarify with better visualization, the computation mode numbering is expressed in both hexadecimal and binary format.

Representative computation modes: In reality, some frequently occurring computation modes will be singled out to handle all the input data and they will be called representative computation modes. The question of how many representative computation modes to use is a matter of design trade-off consideration. Which computation modes will be qualified as frequently occurring representative modes can be solved by a plurality of methods, which can be generally categorized as statistical methods or educated guess methods, or the combination of the two with some modification. The statistical methods find frequently occurring representative modes by running large numbers of streams and building a histogram. The educated guess methods directly result from the principles of transform based video compression. For example, it is known that compu_mode(0xfff0) should be more frequently occurring than compu_mode(0xffff). To simplify the description, a mode which is picked up as one of the frequently occurring representative modes will be denoted as frequ_mode(pat_id), where pat_id is the number to indicate the input data pattern. Note that frequ_mode(pat_id) and compu_mode(pat_id) are basically the same. Some other examples will be given in embodiment 1 and embodiment 2 as follows.

Embodiment 1: The number of frequently occurring modes is determined based on the number of trailing zeros in the coefficients in the input data. For example, it can be assumed that there are 7 frequently occurring representative computation modes: frequ_mode(0xc000), frequ_mode(0xf000), frequ_mode(0xfc00), frequ_mode(0xff00), frequ_mode (0xffc0), frequ_mode(0xfff0) and compu_mode(0xffff). Note that compu_mode(0xffff) should always be included so that it will take care of those input data patterns which cannot be handled by other representative modes.

Embodiment 2: The number of frequently occurring representative modes is determined based on "decimating" the coefficients into multiple frequency groups. A group is considered to be zero only when all the coefficients are zeros. In the case of H.264 4×4 residual block, if every consecutive two coefficients after zigzag are combined into one group, there will be 255 frequently occurring representative modes which can be denoted as compu_mode(0x01) to compu_mode (0xff). Note that compu_mode(0x00) is a degenerated trivial case where all the coefficients are zero and so no computation is needed.

Inverse transform computation based on multiple representative computation modes: In the prior art, given the inverse transform is unambiguously mathematically defined, it is always computed using the same atomic computation sequence without looking into the peculiarities of the input data pattern. In the case of H.264 4×4 residual block, the prior art essentially use the compu_mode(0xffff) only. With the introduction of multiple representative computation modes, inverse transform computation starts with finding a best mode from the representative modes first, followed by assigning the computation to that mode. One of the differences between the prior art and this invention is shown by FIGS. 5A-5B. As shown in FIG. 5A, the prior art takes the input data 100, does the computation 102, and outputs the results 104. In this invention, the input data 100 is fed to a mode assignor 106, which generates control signals 110 to select one of the representative computation modes 108, and the control signals are also fed to the an output selector 112 to generate the output 104.

Assigning a representative computation mode to the input data: the mode assignor 106 assigns a representative computation mode to the input data 100 based on several considerations. The first consideration is that the representative computation mode should indeed be capable of computing the inverse transform, i.e. functionally correct when compared to the result from the mathematical definition of the inverse transform. The second consideration is that the assignor should preferably make the decision relatively quick in order that the overall time of the computation is much less than the prior art. Note that the decision made by the assignor may not necessarily be optimal from a computational point of view in order to trade for less complexity. Various methods can be employed to design the assignor in conjunction with the selected representative modes. Some examples will be given in embodiment 3, embodiment 4, and embodiment 5.

Embodiment 3: If the frequently occurring representative computation modes are determined by the method described in Embodiment 1, the representative computation modes can be found by checking the variable length decoding (VLD) results based on whether each coefficient is zero or not.

Figure 6:
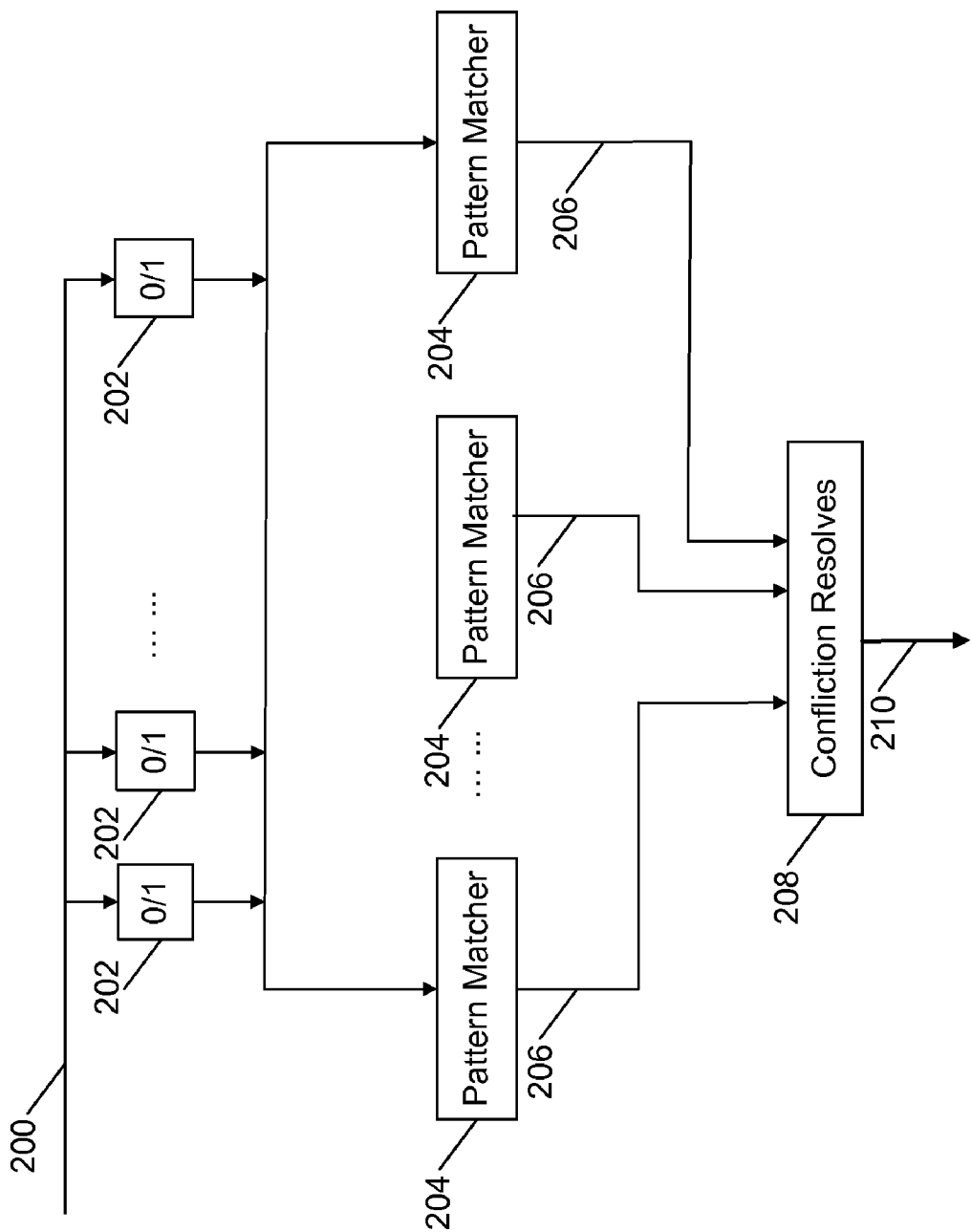
FIG. 6 illustrates a procedure for computing the inverse transform by matching the pattern of input data with a representative computation mode.

Embodiment 4: In the case that the frequently occurring representative computation modes do not show any explicit regularity, such as those obtained by collecting statistics by running large amounts of testing streams, the assignor can make its decision by checking the input data against each frequently occurring mode first; if there are more than 1 mode that can meet the condition, the assignor can select the one with the least computation cost or randomly select one if there are multiple representative modes with the same least computation costs. This procedure is shown as a two-stage decision making procedure in FIG. 6, where the implementation is implied to be hardware based, though the same idea can be easily implemented in software as well. Assuming there are n frequently occurring representative computation modes corresponding to the n pattern matchers 204 in FIG. 6, the input data 200 is first passed through zero/non-zero comparators 202 with one for each transform coefficient, then fed to every pattern matcher 204 to check whether it matches any specific frequently occurring representative mode or not. The results from the pattern matchers 206 are further fed into the confliction resolver 208 in case the input data matches more than 1 frequently occurring representative modes, and the confliction resolver 208 selects only one computation mode as the final result 210.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A method for calculating an inverse transform of input data, wherein said input data having a plurality of coefficients, comprising the steps of:
   determining a plurality of computation modes;
   representing said computation modes by a plurality of representative computation modes as a function of the non-zero coefficients of the input data;
   selecting one of the representative computation modes as a function of the input data;
   inverse transforming the input data using said selected representative computation mode; wherein said representative computation modes are a reduced set of said computation modes; and wherein said representing step is performed as a function of $z_i=(\sim x_i+y_i)$, where $\sim x_i$ means the logical negation of $x_i$ and the "+" sign means the logical OR operation, where a computation mode x is mapped to a representative computation mode y if at every bit location $z_i$ is true.

2. The method of claim 1 wherein in determining the plurality of computation modes, each of the coefficients of the input data are converted into a single binary value wherein non-zero-valued coefficients are converted to "1" and zero-valued coefficients are converted to "0".

3. The method of claim 2 wherein said input data is determined into a particular computation mode as a function of the zero or non-zero binary value of the coefficients.

4. The method of claim 1 wherein a computation mode x is mapped to a single representative computation mode y, if a computation mode x can be mapped to more than one computation mode y.

5. The method of claim 1 wherein in said representing step, one or more frequently occurring modes are selected as representative computation modes by using statistical analysis.

6. The method of claim 5 wherein a number of frequently occurring modes as representative computation modes is determined based upon the number of trailing zeros in the coefficients in the input data.

7. The method of claim 5 wherein a number of frequently occurring modes as representative computation modes is determined based upon decimating the coefficients into multiple frequency groups.

8. The method of claim 5 wherein in said selecting step, the representative computation mode used to calculate the inverse transform is selected as a function of a respective computational cost.

9. The method of claim 1 wherein in said representing step, one or more frequently occurring modes are selected as representative computation modes based upon the number of trailing zeros in the coefficients in the input data.

10. The method of claim 1 wherein in said representing step, one or more frequently occurring modes are selected as representative computation modes based upon decimating the coefficients into multiple frequency groups.

11. The method of claim 1 wherein in said selecting step, the representative computation mode used to calculate the inverse transform is selected as a function of a respective computational cost.

12. A method for calculating an inverse transform of input data, wherein said input data having a plurality of coefficients, comprising the steps of: determining a plurality of computation modes, wherein each of the coefficients of the input data are converted into a single binary value wherein non-zero-valued coefficients are converted to "1" and zero-valued coefficients are converted to "0"; selecting one or more frequently occurring modes; representing said computation modes by a plurality of representative computation modes wherein $z_i = (\sim x_i + y_i)$, where $\sim x_i$ means the logical negation of $x_i$ and the "+" sign means the logical OR operation, where a computation mode x is mapped to a representative computation mode y if at every bit location $z_i$ is true, and wherein said one or more frequently occurring modes are selected as one or more representative computation modes; selecting one of the representative computation modes as a function of the input data and as a function of the respective computational cost for the representative computation modes; and inverse transforming the input data using said selected representative computation mode.

13. The method of claim 12 wherein in said selecting frequently occurring modes step, one or more frequently occurring modes are selected by using statistical analysis.

14. The method of claim 12 wherein in said selecting frequently occurring modes step, one or more frequently occurring modes are selected based upon the number of trailing zeros in the coefficients in the input data.

15. The method of claim 12 wherein in said selecting frequently occurring modes step, one or more frequently occurring modes are selected based upon decimating the coefficients into multiple frequency groups.

16. The method of claim 12 wherein said representative computation modes are a reduced set of said computation modes.

17. A method for calculating an inverse transform of input data, wherein said input data having a plurality of coefficients, comprising the steps of: determining a plurality of computation modes, wherein each of the coefficients of the input data are converted into a single binary value wherein non-zero-valued coefficients are converted to "1" and zero-valued coefficients are converted to "0"; selecting frequently occurring modes; representing said computation modes by a plurality of representative computation modes as a function of the non-zero coefficients of the input data wherein $z_i = (\sim x_i + y_i)$, where $\sim x_i$ means the logical negation of $x_i$ and the "+" sign means the logical OR operation, where a computation mode x is mapped to a representative computation mode y if at every bit location $z_i$ is true, wherein said representative computation modes are a reduced set of said computation modes, and wherein said one or more frequently occurring modes are selected as representative computation modes; selecting one of the representative computation modes as a function of zero or non-zero coefficients of the input data and as a function of the respective computational cost for the representative computation modes; and inverse transforming the input data using said selected representative computation mode.

18. The method of claim 16 wherein a number of frequently occurring modes is determined by using statistical analysis, based upon the number of trailing zeros in the coefficients in the input data, or based upon decimating the coefficients into multiple frequency groups.

* * * * *